(12) United States Patent
Shoykhet et al.

(10) Patent No.: US 9,099,864 B2
(45) Date of Patent: Aug. 4, 2015

(54) ELECTRONIC DEVICE WITH CONNECTOR FAULT PROTECTION CIRCUITRY

(71) Applicant: Apple Inc., Cupertino, CA (US)

(72) Inventors: Eugene L. Shoykhet, San Jose, CA (US); Yehonatan Perez, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 325 days.

(21) Appl. No.: 13/750,263

(22) Filed: Jan. 25, 2013

(65) Prior Publication Data

US 2014/0211351 A1   Jul. 31, 2014

(51) Int. Cl.
*H02H 3/00* (2006.01)
*H02H 3/20* (2006.01)
*G06F 13/38* (2006.01)

(52) U.S. Cl.
CPC . *H02H 3/20* (2013.01); *G06F 13/38* (2013.01)

(58) Field of Classification Search
USPC .......................................................... 361/86
See application file for complete search history.

(56) References Cited

U.S. PATENT DOCUMENTS

| | | | |
|---|---|---|---|
| 5,428,523 A * | 6/1995 | McDonnal | 363/71 |
| 5,944,827 A * | 8/1999 | Shima et al. | 713/320 |
| 5,990,786 A * | 11/1999 | Issa et al. | 340/429 |
| 7,059,769 B1 | 6/2006 | Potega | |
| 7,706,112 B2 * | 4/2010 | Crawley et al. | 361/56 |
| 8,139,328 B2 | 3/2012 | DiSalvo et al. | |
| 2004/0164707 A1 * | 8/2004 | Veselic et al. | 320/128 |
| 2004/0164708 A1 * | 8/2004 | Veselic et al. | 320/132 |
| 2008/0165460 A1 * | 7/2008 | Whitby-Strevens | 361/86 |
| 2010/0073837 A1 | 3/2010 | Predtetchenski et al. | |
| 2011/0095605 A1 * | 4/2011 | Lanni | 307/24 |
| 2011/0273805 A1 * | 11/2011 | Nguyen | 361/87 |
| 2012/0187964 A1 | 7/2012 | Michaelis et al. | |
| 2012/0295483 A1 | 11/2012 | Smed | |
| 2013/0073060 A1 * | 3/2013 | Dawley et al. | 700/20 |
| 2013/0286522 A1 * | 10/2013 | Mullins et al. | 361/58 |
| 2013/0286523 A1 * | 10/2013 | Mullins et al. | 361/93.9 |
| 2014/0013012 A1 * | 1/2014 | Terlizzi et al. | 710/15 |

* cited by examiner

*Primary Examiner* — Ronald W Leja
(74) *Attorney, Agent, or Firm* — Treyz Law Group; Kendall P. Woodruff (57) ABSTRACT

An electronic device may include protection circuitry coupled to a connector port. The connector port may be a reversible connector port that receives a mating reversible connector plug with either first or second orientations. The connector port may include contacts for receiving and/or transmitting signals during communications between the electronic device and the accessory device. The protection circuitry may monitor signals received at the contacts to determine whether transient or permanent connection faults exist. In response to determining that a connection fault exists at any of the contacts, the protection circuitry may electrically disconnect the faulty contacts from processing circuitry in the electronic device.

25 Claims, 8 Drawing Sheets

ELECTRONIC DEVICE WITH CONNECTOR FAULT PROTECTION CIRCUITRY

BACKGROUND

This relates generally to electronic devices with connector ports, and more particularly, electronic devices with power protection circuitry.

Handheld electronic devices and other portable electronic devices are becoming increasingly popular. Examples of handheld devices include handheld computers, tablet computers, media players, cellular telephones, and hybrid devices that include the functionality of multiple devices of this type.

During normal operation, the host device and accessory device may communicate by supplying power at a desired connector port. If the accessory or cable is defective or poorly designed, the power may be supplied at an incorrect connector port or an excessive amount of power may be supplied. This behavior may cause damage to the host device.

It would therefore be desirable to provide protection circuitry for preventing damage when accessories are coupled to the electronic device.

SUMMARY

Electronic devices having connector ports are provided. The connector ports may receive mating connector plugs that couple the connector ports to accessory devices. An electronic device may include protection circuitry coupled to a connector port. The connector port may be a reversible connector port that receives a mating reversible connector plug with either first or second orientations. The connector port may include a plurality of contacts for receiving and/or transmitting signals during communications between the electronic device and the accessory device.

The protection circuitry may include a detection circuit coupled to each of the contacts or a subset of the contacts. The detection circuit may include a comparator that receives a reference voltage from a digital-to-analog converter (DAC) circuit. The reference voltage may be selected by control circuitry based on the communications protocol used for accessory communications and may serve as a threshold voltage. Each detection circuit may be configured to use a different reference voltage or may use the same reference voltage. The comparator may compare the reference voltage to a signal received at the contact to produce a detection signal. The control circuitry may use the detection signals from the comparators to identify whether faults exist that are associated with the accessory device or with the connection between the accessory device and the electronic device.

Further features of the present invention, its nature and various advantages will be more apparent from the accompanying drawings and the following detailed description.

DETAILED DESCRIPTION

Embodiments of the present invention relate to electronic devices with connector ports. Electronic devices such as laptop computers, tablet computing devices, cellular telephones, music players, or other portable electronic devices may contain connector ports for communicating with other electronic devices. A given connector port (sometimes referred to herein as a female connector) may receive a connector plug (sometimes referred to herein as a male connector) with a corresponding connector cable that may electrically couple the given connector port to the connector port of another electronic device. Each port may contain conductive paths (e.g., contacts such as metal traces, conductive pins, or other conductive contacts) through which data signals or power supply signals may be transferred between the port and corresponding conductive paths of the connector plug.

As an example, a tablet computing device may contain a connector port used to communicate with a speaker dock (e.g., by providing audio signals to the speaker dock and receiving power supply signals from the speaker dock). The speaker dock may contain power supply circuitry that provides power supply voltages to the tablet computing device through conductive paths of the connector port, connector cable, and connector plug. This example is merely illustrative. A connector port may be used for communications with accessories using serial communications protocols such as the Universal Serial Bus protocol, the Universal Asynchronous Receiver-Transmitter protocol, digital audio protocols, or any desired communications protocols.

Some connector ports receive connector plugs with a predetermined orientation. These connector ports are sometimes referred to herein as fixed-orientation connector ports. For proper operation, each of the conductive paths (e.g., pins or metal contacts) of a fixed-orientation connector port couple to predetermined locations (e.g., pins or metal contacts) of a mating fixed-orientation connector plug (e.g., a male mating connector).

It may be desirable to provide connector ports that accommodate reversible connector plugs (i.e., connector ports that accommodate connector plugs with multiple orientations). Connector ports that accommodate reversible connector plugs may sometimes be referred to herein as reversible connector ports. An illustrative electronic device 10 with a reversible connector port 20A is shown in FIG. 1.

Figure 1:
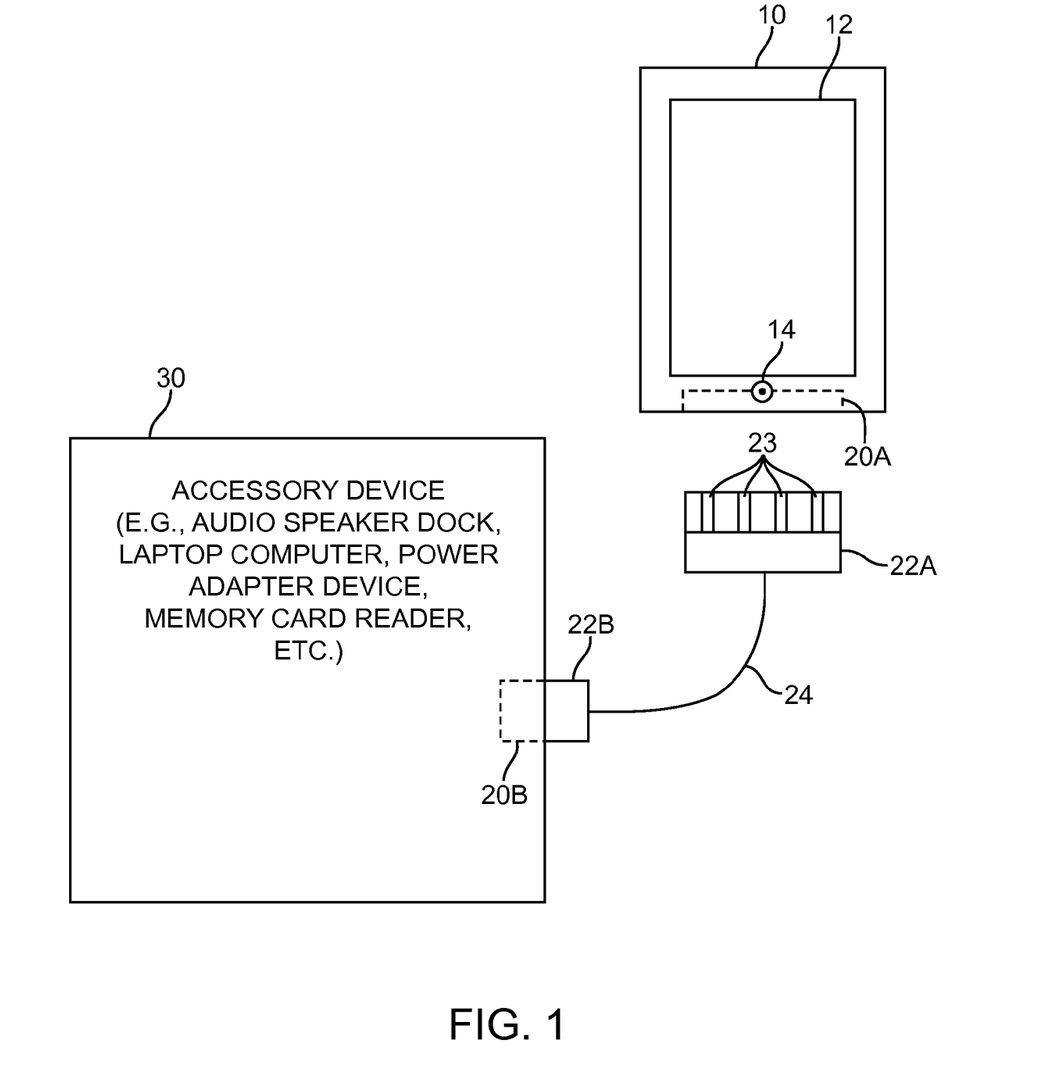
FIG. 1 is a schematic diagram of an illustrative electronic device with a connector port that may be coupled to an accessory device via a mating connector in accordance with an embodiment of the present invention.

As shown in FIG. 1, electronic device 10 may include a display 12 and a button 14. Electronic device 10 may include a reversible connector port 20A suitable for receiving a reversible connector plug 22A. Reversible connector port 20A may be an 8-pin connector port (e.g., an 8-pin female connector) suitable for receiving an 8-pin mating connector 22A. This example is merely illustrative. Connector port 20A may have any desired number of contacts (e.g., 6 pins, 8 pins, etc.). Mating connector plug 22A may have conductive traces 23 (or contacts) for electrically coupling connector plug 22A to connector port 20A (e.g., connector port 20A may contain conductive contacts that electrically couple with conductive contacts 23 when mating connector 22A is inserted into connector port 20A).

Connector plug 22A may be coupled to a connector plug 22B via connector cable 24. Connector cable 24 may convey signals from connector plug 22A to connector plug 22B. Connector plug 22B may be an independent connector plug or integrated with an accessory device 30. For example, connector plug 22B may be coupled to a connector port 20B or built into accessory device 30. Accessory device 30 may be a device suitable for communicating with, supplying power, or receiving power from electronic device 10. Examples of suitable accessory devices include memory card readers, laptop computers, audio speaker docks, alternating current (AC) power adapters, etc. Accessory device 30 may convey data signals or power supply signals to electronic device 10 via connector plug 22B, connector cable 24, and connector plug 22A. Conversely, electronic device 10 may convey data signals or power supply signals to accessory device 30.

Figure 2:
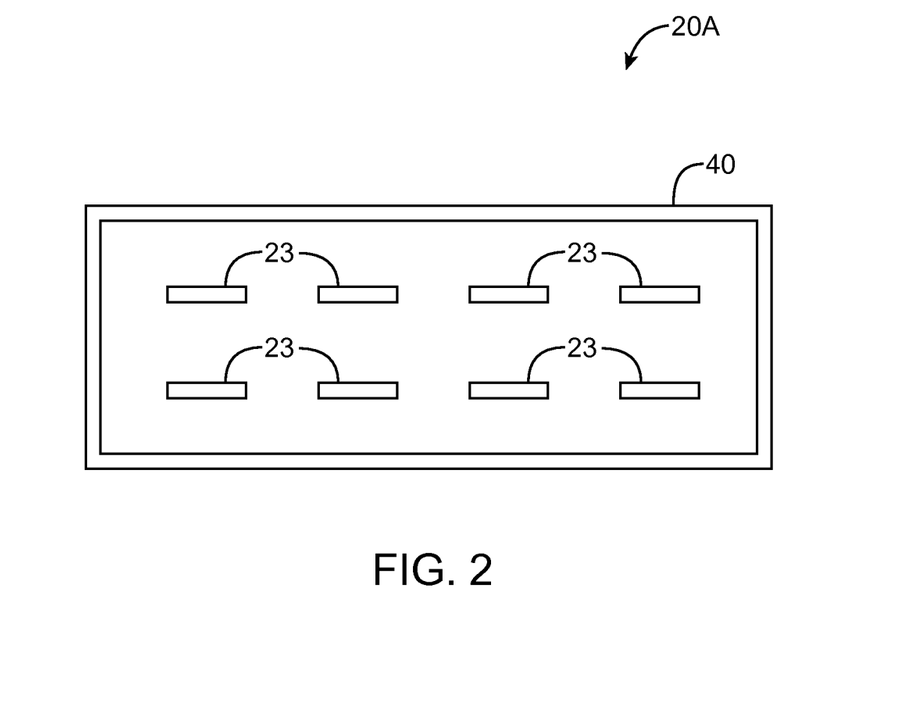
FIG. 2 is a schematic diagram of an illustrative reversible connector port in accordance with an embodiment of the present invention.

An illustrative reversible connector port 20A for receiving reversible connector plugs is shown in FIG. 2. As shown in FIG. 2, reversible connector port 20A may contain conductive paths 23 (e.g., contacts). Conductive paths 23 may be used to convey signals such as data signals or power supply signals between reversible connector port 20A and a mating connector plug 22 (e.g., plug 22A or 22B of FIG. 1). A ground signal may be provided for connector port 20A through a metal grounding shell 40. If desired, metal grounding shell 40 may provide structural support for receiving a mating connector plug.

Connector port 20A may receive mating connector plugs with multiple orientations. The mating connector plug may be received with a first orientation such that each contact on the mating connector plug is coupled to respective contacts on connector port 20A. The mating connector plug may be received with a second orientation such that each contact on the mating connector plug is coupled to a different respective contact on connector port 20A. For example, the mating connector plug may be rotated 180 degrees (e.g., reversed) between the first and second orientations. In this scenario, a contact on the mating connector plug may be coupled to the upper-left contact of connector port 20A in the first orientation and may be coupled to the lower-right contact of connector port 20A in the second orientation (as an example).

Figure 3:
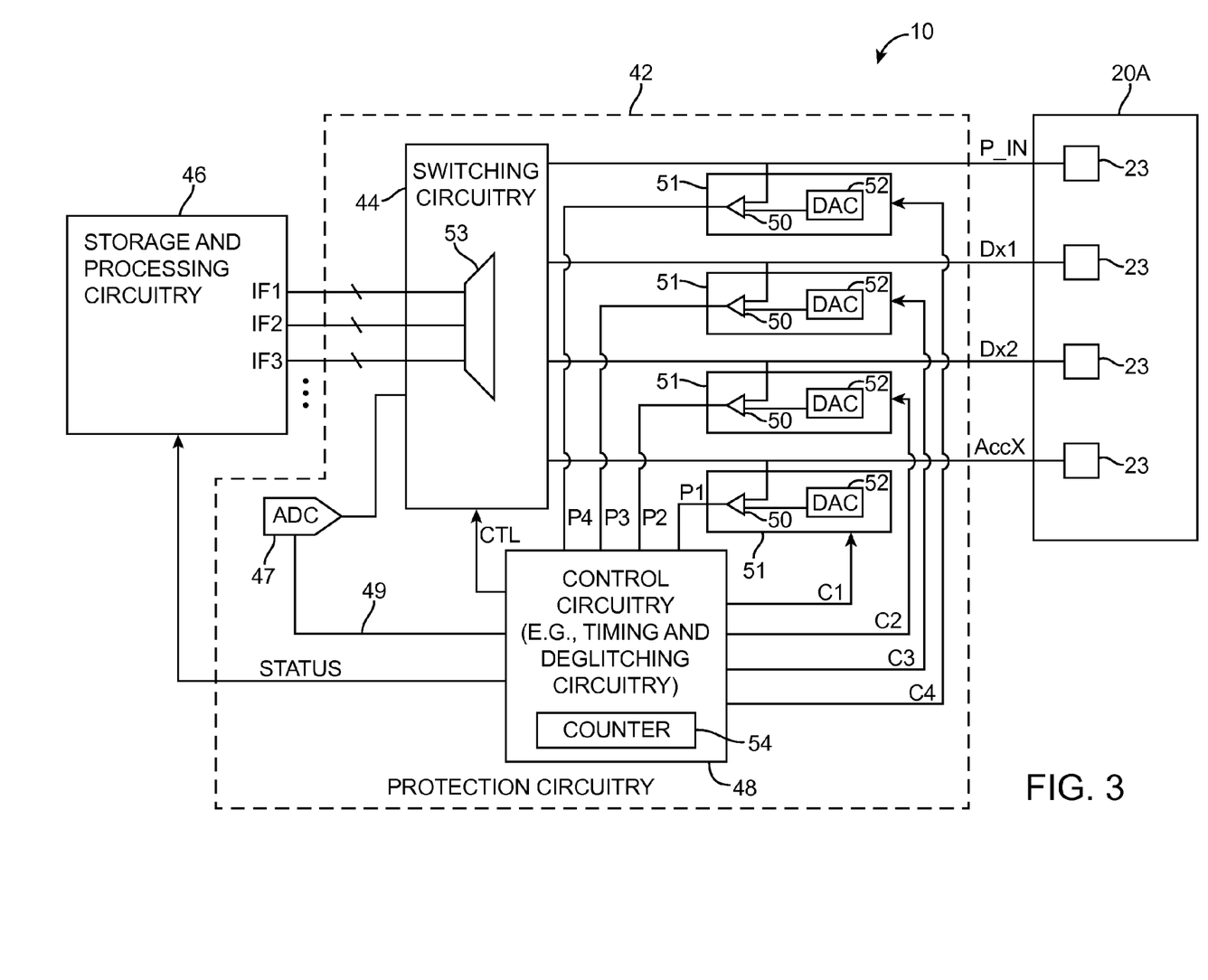
FIG. 3 is a circuit diagram of an illustrative electronic device with protection circuitry that is coupled to a connector port in accordance with an embodiment of the present invention.

To accommodate reversible connections, control circuitry coupled to a connector port may detect the orientation of an inserted connector plug and use the detected orientation to configure connector port circuitry. However, if connector cables and/or accessory devices are faulty or poorly designed, signals may be conveyed over incorrect contacts of the connector port. This is especially challenging for reversible connectors in which different contacts of a connector plug can be coupled to any given contact of the connector port due to orientation. If power supply or data signals are incorrectly supplied (e.g., at an incorrect contact or having incorrect voltages), circuitry on the electronic device may potentially be damaged. It can also be challenging to protect circuitry on electronic devices having non-reversible connectors. For example, the number of contacts on a connector port may be constrained by the physical size of the connector port. In this scenario, the limited number of contacts of the connector port may be used to accommodate multiple communications protocols by conveying different signals based on the currently used communications protocol (e.g., the currently used communications protocol may depend on the accessory device that is connected to the connector port). Circuitry that is coupled to the connector port can potentially be damaged if signals are incorrectly supplied to the contacts. To help prevent damage to the electronic device, protection circuitry coupled to the connector port may be provided. FIG. 3 is a simplified circuit diagram of an electronic device 10 having protection circuitry for connector port 20A.

As shown in FIG. 3, electronic device 10 may include storage and processing circuitry 46 and protection circuitry 42 that is coupled to connector port 20A. Protection circuitry 42 may include switching circuitry 44, control circuitry 48, and detection circuits 51. Switching circuitry 44 may receive and convey signals between storage and processing circuitry 46 and connector port 20A. In the example of FIG. 3, switching circuitry 44 may convey signals P_IN, DX1, DX2, and ACCX between contacts 23 of connector port 23A and storage and processing circuitry 46. The signals may be provided to interfaces IF1, IF2, and/or IF3 of storage and processing circuitry 46. Interfaces such as IF1, IF2, and IF3 may be used for communications protocols such as USB, UART, other serial protocols, digital audio protocols, or any desired communications protocol. The signals may be differential or single-ended. For example, signal DX1 may be a differential signal provided over two contacts 23 to a selected interface.

The example of FIG. 3 in which storage and processing circuitry 46 includes three interfaces is merely illustrative. If desired, processing circuitry 46 may include any desired number of interfaces (e.g., one, two, three, or more) that communicate with accessories via connector port 20A.

Storage and processing circuitry 46 may include processing circuitry such as one or more general-purpose or application-specific processors. For example, processing circuitry 46 may include a central processing unit and/or digital signal processors. Processing circuitry 46 may include one or more integrated circuits. For example, processing circuitry 46 may include a so-called "system-on-a-chip" (SOC) that integrates multiple components in a single chip. Storage circuitry 46 may include hard-disk based storage, memory circuitry such as random access memory circuitry, or other storage circuits.

Switching circuitry 44 may be controlled by control circuitry 48 to selectively route signals between interfaces of processing circuitry 46 and contacts 23 of connector port 20A. Switching circuitry 44 may include multiplexing circuitry 53, switches, or other switching circuits. Control circuitry 48 may provide control signal CTL that controls the configuration of switching circuitry 44. For example, control signal CTL may direct switching circuitry 44 to route signals P_IN and DX1 from contacts 23 to a USB interface IF1 in a first configuration and may direct switching circuitry 44 to route signals P_IN and DX1 from contacts 23 to a UART interface IF2 in a second configuration. In general, switching circuitry 44 may be configured to route some or all of the signals received at contacts 23 to one or more selected interfaces of processing circuitry 46.

Each interface of storage and processing circuitry 46 may operate at voltage levels that are established by the corresponding communications protocol. For example, USB interfaces may operate at an accessory-provided supply voltage (e.g., P_IN) of about 5 volts, whereas UART interfaces may operate at a supply voltage of about 1.8 volts and digital audio interfaces may operate at about 3 volts. Circuitry that is coupled to each interface may be designed to accommodate the supply voltage of the corresponding communications protocol. However, in some scenarios, it may be possible for incorrect supply voltages to be provided to the processing interfaces.

Protection circuitry 42 may include detection circuits 51 that are coupled to respective connector port contacts 23. Detection circuits 51 may be used to determine whether the signals received at connector port contacts 23 have voltage levels that exceed desired threshold voltages and may provide detection signals to control circuitry 48. Control circuitry 48 may use the detection signals to determine whether connection faults exist between connector port 20A and a connected accessory. Control circuitry 48 may, if desired, provide an optional fault status signal STATUS to storage and processing circuitry 46 that identifies whether or not a connection fault has been detected. The fault status signal may serve as an interrupt to normal operation of circuitry 46.

Detection circuits 51 may sometimes be referred to herein as real-time detection circuits, because the detection circuits monitor signal voltages of contacts 23 in real-time during normal communication operations between device 10 and accessory 30. Each detection circuit 51 may include a comparator that compares the voltage received at the respective contact 23 to a reference voltage. Each reference voltage may be provided by a digital-to-analog converter (DAC) 52 that receives a control signal from control circuitry 48. In the example of FIG. 3, detection circuit 51 that receives signal P_IN may receive control signal C4 and produce a corresponding detection signal P4, detection circuit 51 that receives signal DX1 may receive control signal C3 and produce detection signal P3, detection circuit 51 that receives signal DX2 may receive control signal C2 and produce detection signal P2, and detection circuit 51 that receives signal ACCX may receive control signal C1 and produce detection signal P1.

The control signals provided by control circuitry 48 may be digital control signals that are converted into corresponding analog voltages by DAC circuits 52. Control circuitry 48 may generate control signals C1, C2, C3, and C4 so that each signal received at connector port contacts 23 is compared to an appropriate reference voltage (threshold voltage). Consider the scenario in which connector port 20A is coupled to a UART accessory device 30. In this scenario, electronic device 10 may expect signal P_IN to be supplied at 1.8 volts. Control circuitry 48 may set the value of control signal C4 such that DAC 52 that receives signal C4 produces a reference voltage of 1.8 volts. Comparator 50 that receives the 1.8 volt reference voltage may compare signal P_IN to the 1.8 volt reference voltage. If signal P_IN is less than the reference voltage (e.g., less than 1.8 volts), comparator 50 may produce detection signal P4 having a logic zero output. In response to identifying that signal P_IN exceeds the reference voltage, comparator 50 may produce detection signal P4 having a logic one value.

Control circuitry 48 may be configured to adjust the reference voltage to a voltage level that is somewhat higher than a target operating voltage (e.g., via control signals C1, C2, C3, and C4). Such configurations may be desirable in scenarios in which interfaces of storage and processing circuitry 46 are capable of withstanding voltages that are somewhat greater than typical operating voltages. For example, the USB protocol may specify an operating voltage of 5 volts for a USB interface. However, the USB interface of circuitry 46 may be capable of withstanding voltages of up to twenty percent higher than the specified operating voltage (e.g., up to 6 volts). In this scenario, control circuitry 48 may set control signal C4 to a value such that corresponding DAC circuit 52 produces a reference voltage of 6 volts.

In general, the reference voltages to which received signals are compared to may depend on the communications protocol and the capabilities of the interface circuitry of circuitry 46. For example, the reference voltage for USB interfaces may be 5 volts, the reference voltage for UART interfaces may be 1.8 volts, the reference voltage for digital audio interfaces may be 3 volts, etc. These examples are merely illustrative. The reference voltages may be set to a target operating voltage (e.g., specified by a communications protocol) or may be set to somewhat higher voltages such as ten or twenty percent higher than the target operating voltage. The reference voltages may be adjusted by control circuitry 48 based on the communications protocol used by a connected accessory 30.

If desired, additional control signals may be provided to detection circuits 51 from control circuitry 48. For example, control circuitry 48 may provide control signals that enable and/or disable detection circuits 51. In this scenario, detection circuits 51 may be selectively enabled (e.g., enabled and/or disabled separately) or may be collectively enabled and disabled.

The example of FIG. 3 in which electronic device 10 is provided with protection circuitry 42 for a reversible connector port 20A is merely illustrative. If desired, protection circuitry 42 may be provided for non-reversible connector ports (e.g., fixed-orientation) to help protect against connector faults (e.g., faults that result in an undesired or excessive voltage received at contacts of the connector ports).

Figure 4:
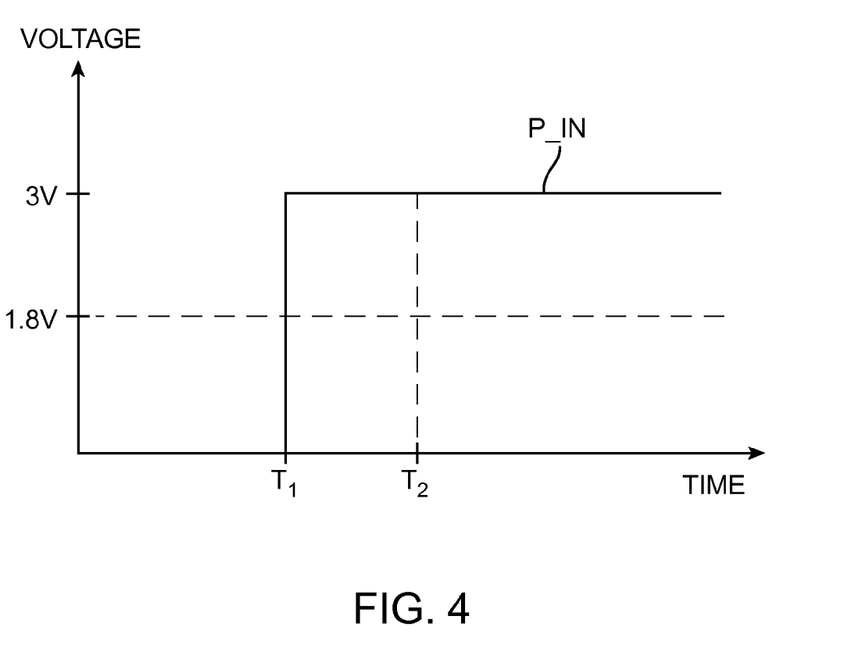
FIG. 4 is an illustrative diagram showing how protection circuitry may detect connection faults in accordance with an embodiment of the present invention.

FIG. 4 is an illustrative graph showing how an incorrect supply voltage may be provided to a processing interface and detected using detection circuits 51. In the example of FIG. 4, accessory 30 may be initially disconnected and power supply signal P_IN may be zero volts. Accessory 30 may be an audio accessory that communicates using a digital audio protocol operating at 3 volts. At time T1, accessory 30 may be connected to device 10 via connector port 20A and cable 24 (see, e.g., FIG. 1). Accessory 30 may identify itself as an audio accessory that uses the digital audio protocol. For example, accessory 30 may supply an identification signal via signal ACCX that is initially routed to ADC circuit 47 by switching circuitry 44. In this scenario, control circuitry 48 may use the digital output of ADC circuit 47 to determine which interface should be used to communicate with accessory 30. For example, control circuitry 48 may control switching circuitry 44 to route signals from a digital audio accessory to a digital audio interface, USB signals to a USB interface, UART signals to a UART interface, etc.

During initial setup operations, miscommunication between accessory 30 and device 10 may result in incorrect signal routing between processing interfaces and connector port 20A. If accessory device 20A provides an incorrect identification signal at time T1, device 10 may route digital audio signals operating at 3 volts to a UART interface that is only capable of operating at 1.8 volts (as an example). Operating the UART interface at an excessively high voltage of 3 volts can damage the UART interface circuitry.

Various scenarios may cause excessive voltages to be supplied to processing interfaces. For example, faults or physical damage to cable 24, connector plug 22A, or accessory device 30 may produce undesired shorting paths between signal paths. If accessory device 30 is poorly designed, accessory 30 may supply voltages that are excessive or otherwise incompatible with an intended communications protocol.

To prevent potential damage to processing interfaces, control circuitry 48 may electrically disconnect the accessory device at time T1. Control circuitry 48 may electrically disconnect accessory device 30 by providing control signal CTL having a value that directs switching circuitry 44 to disconnect connector port 20A from interfaces of circuitry 46. If desired, only contacts that receive excessive voltage levels may be disconnected.

In some scenarios, interfaces of circuitry 46 may be capable of withstanding excessive voltage levels for short periods of time. Based on the capabilities of circuitry 46, control circuitry 48 may be configured to delay electrical disconnection of accessory 30 by a predetermined time threshold. For example, control circuitry 48 may include timing circuitry such as counter 54 that begins counting upon detection of an excessive voltage received at contacts 23 (e.g., at time T1). Counter 54 may continue to count until the detected voltage decreases below a threshold voltage (e.g., is no longer excessive) or until counter 54 reaches a threshold counter value. If the detected voltage decreases below the threshold voltage, the counter may be reset to zero. After counter 54 reaches the threshold counter value (e.g., at time T2), accessory 30 may be disconnected.

The threshold counter value may represent an amount of time that electrical disconnection of accessory 30 is delayed. The amount of time may correspond to the counter value multiplied by the frequency (e.g., clock rate) at which the counter value is updated. In the example of FIG. 4, the threshold counter value may represent the amount of time between T1 and T2. If desired, the threshold counter value may be determined for each interface of processing circuitry 46. For example, interface IF1 may have a first corresponding counter threshold, interface IF2 may have a second counter threshold, and interface IF3 may have a third counter threshold.

Figure 5:
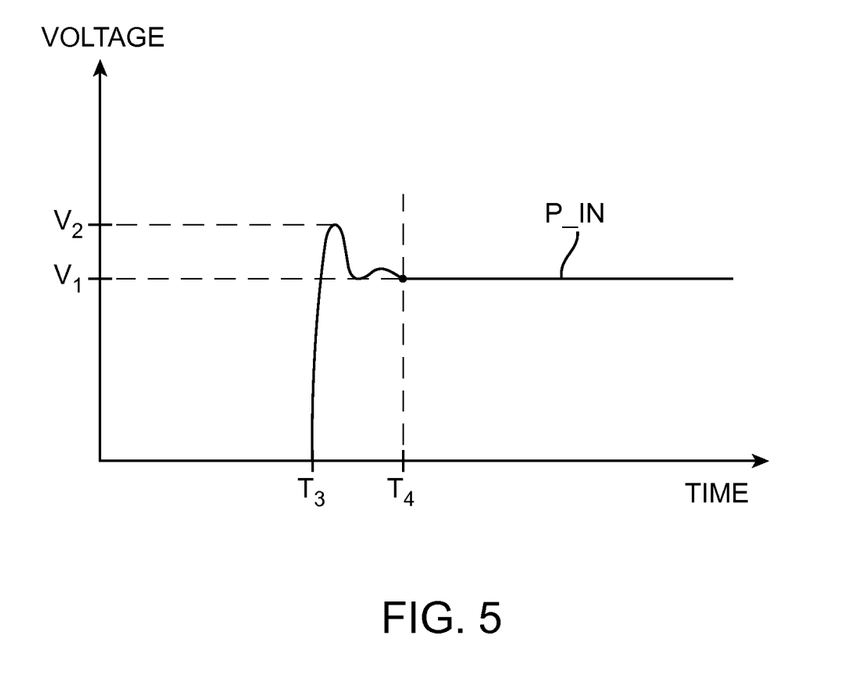
FIG. 5 is an illustrative diagram showing how protection circuitry may accommodate transient faults in accordance with an embodiment of the present invention.

Delaying electrical disconnection of accessory 30 may be desirable in scenarios such as when initial accessory-to-device connections cause electrical fluctuations or transient faults cause momentary signal fluctuations. FIG. 5 is an illustrative graph showing how voltage levels of power supply signal P_IN may fluctuate during initial connection operations.

As shown in FIG. 5, an accessory device 30 that is connected to device 10 at time T3 may initially supply a voltage V2 that exceeds a desired operating voltage V1. The supplied voltage may exceed the desired operating voltage due to transient faults (e.g., due to the initial connection of device 10 and accessory 30 or due to other transient conditions) and may eventually stabilize at time T4. In other words, voltage fluctuations due to transient faults and not to permanent faults may eventually reach steady-state operating conditions. The threshold counter value may be selected so sufficient time is allowed for voltage fluctuations to stabilize while ensuring that interface circuitry is protected. For example, the interface circuitry may be capable of withstanding excessive voltages for a limited amount of time. In this scenario, the threshold counter value may be selected based on the capability of the interface circuitry to withstand excessive voltages. The threshold counter value may be selected so that electrical disconnection of accessory 30 is delayed by any desired amount of time (e.g., one microsecond, 10 microseconds, 100 microseconds, greater than one second, or any other desired amount of time).

Figure 6:
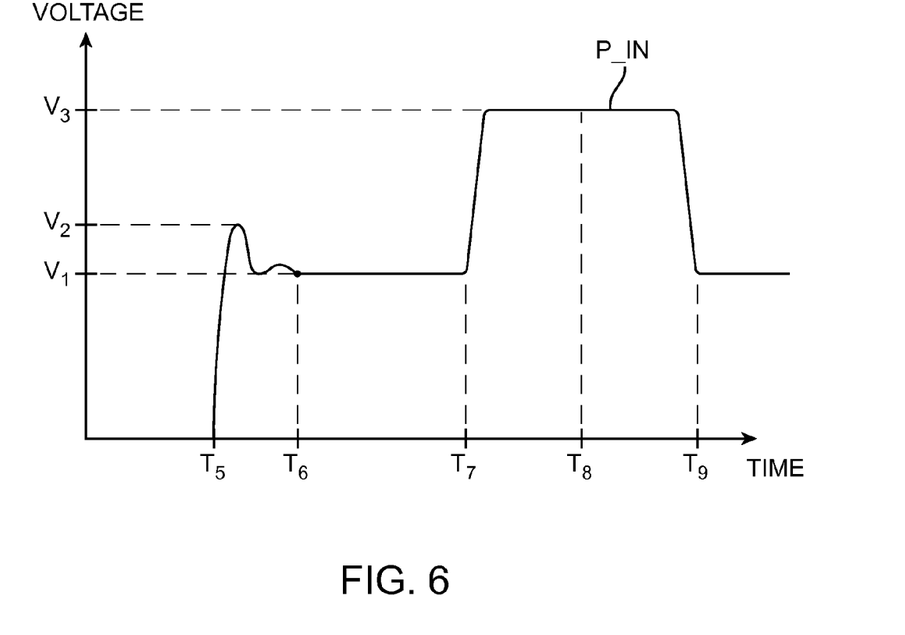
FIG. 6 is an illustrative diagram showing how protection circuitry may detect connection faults that occur after initial accessory connection operations in accordance with an embodiment of the present invention.

In some scenarios, faults occur after initial connection operations between accessory 30 and device 10. FIG. 6 is an illustrative graph showing how a fault may occur after initial connection operations (e.g., after steady state conditions). At time T5, accessory 30 may be connected to device 10. Between times T5 and T6, voltage supplied by accessory 30 may fluctuate (e.g., up to voltage V2). At time T6, the supplied voltage may stabilize at operating voltage V1. The difference between time T6 and T5 may be insufficient for the counter of control circuitry 48 to exceed the threshold counter value, and control circuitry 48 may maintain (allow) the connection between device 10 and accessory 30. The counter may be reset at time T6 (e.g., because the voltage of P_IN may decrease below a corresponding voltage threshold).

At subsequent time T7, the supplied voltage of signal P_IN may increase to an excessive voltage V3 (e.g., a voltage V3 that is greater than V1 and may cause damage to interface circuitry). The supplied voltage may increase due to a permanent fault such as when cable 24 and/or accessory 30 is damaged or due to a transient fault such as a software glitch. At time T7, the counter 54 may be enabled and begin counting.

At time T8, counter 54 may reach the threshold counter value and control circuitry 48 may determine that a connection fault has occurred for longer than the threshold time and can potentially damage electronic device 10 (e.g., the fault is a permanent fault or transient fault of extended duration). In response, control circuitry 48 may configure switching circuitry 44 to protect interface circuitry by electrically disconnecting the connector port contact associated with the connection fault.

If desired, protection circuitry 42 may be configured to periodically monitor a connection previously identified as faulty to determine whether the fault was merely a transient fault. In the example of FIG. 6, after time T8, the connection between device 10 and accessory 30 may be identified as a faulty connection. However, at time T9, the supplied voltage may decrease to operating voltage V1, which may indicate that the fault identified at time T8 was merely a transient fault. Permanent faults may result in consistently excessive voltages that are received at connector 20A.

Control circuitry 48 may be configured to identify transient faults by periodically monitoring voltages supplied at contacts 23 using analog-to-digital converter (ADC) 47. Control circuitry 48 may provide a control signal to switching circuitry 44 so that the analog voltage supplied at a given contact 23 is routed via switching circuitry 44 to ADC 47, which produces a measured digital value on path 49. Control circuitry 48 may receive the measured value from path 49 and use the measured value to determine whether supplied voltages have returned to acceptable operating values (e.g., by comparing the measured value to a threshold value associated with the current communications protocol). Periodic monitoring of supplied voltages may be performed subsequent to fault identification (e.g., to determine whether an identified fault is merely a transient fault or is a permanent fault).

Figure 7:
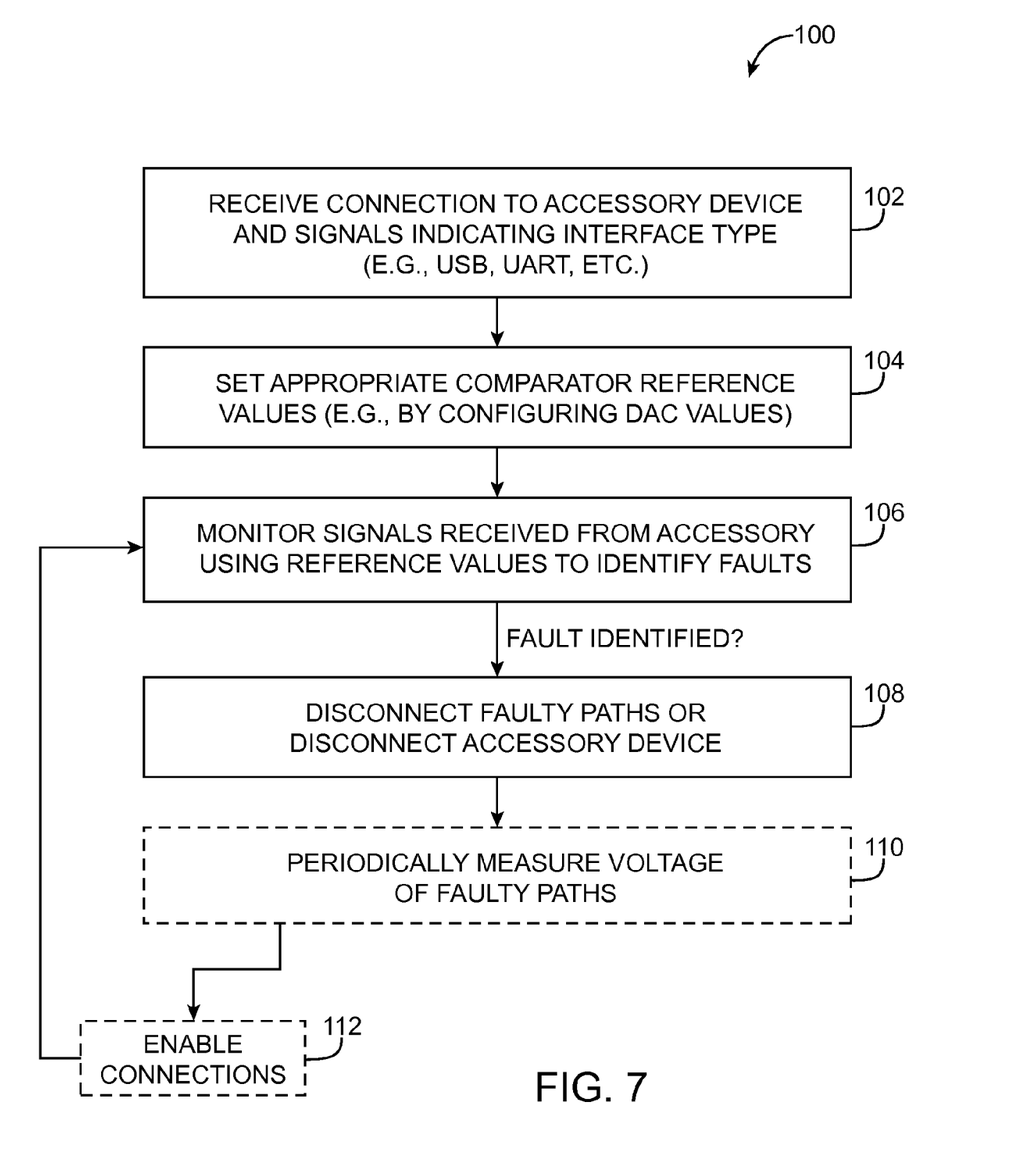
FIG. 7 is a flow chart of illustrative steps that may be performed by an electronic device using power protection circuitry to protect against connection faults in accordance with an embodiment of the present invention.

FIG. 7 is a flow chart 100 of illustrative steps that may be performed to protect electronic device 10 from transient and permanent faults associated with accessory connections. The steps of flow chart 100 may, for example, be performed by protection circuitry 42 of FIG. 3.

During step 102, electronic device 10 may receive a connection to an accessory device such as accessory 30 of FIG. 1. Device 10 may receive identification signals from the accessory device that indicate the interface type support by the accessory device (e.g., USB, UART, digital audio, etc.).

During step 104, device 10 may use the received identification signals to determine which processing interface to use for communications with the accessory. For example, device 10 may be configured so that control circuitry 48 initially directs switching circuitry 44 to route an identification signal from a predetermined contact 23 to ADC 47 (e.g., accessory identification signal ACCX). In this scenario, control circuitry 48 may monitor the identification signal and, in response to receiving the identification signal from the accessory device, may determine which processing interface to use for the connected accessory device. Control circuitry 48 may set comparator reference values for detection circuits 51 based on the identified interface. For example, in response to identifying a USB interface, control circuitry 48 may adjust DAC values to produce a reference voltage of 5 volts. As another example, in response to identifying a UART interface, control circuitry 48 may control one or more DAC circuits 51 to produce a reference voltage of 1.8 volts.

During step 106, device 10 may monitor signals received from the accessory using the reference values to identify faults (e.g., transient and/or permanent faults). The signals may be monitored using detection circuits 51 that are coupled to respective signal paths (e.g., connector port contacts 23). For example, comparators 50 may monitor the signal paths to produce detection signals that identify whether the signals received from the accessory exceed assigned reference values.

During step 108, control circuitry 48 may electrically disconnect (disable) faulty paths or disconnect the accessory device in response to identifying that at least one of the signals received on the signal paths exceeds a corresponding reference value. Signal paths may be selectively (e.g., individually) disabled or collectively disabled using switching circuitry 44. If desired, control circuitry 48 may delay disconnection to accommodate transient fluctuations in voltage (e.g., using counter 54).

If desired, the process may subsequently proceed to optional step 110. During optional step 110, device 10 may periodically measure the voltage of faulty paths to determine whether the identified fault is a transient fault or a permanent fault. For example, control circuitry 48 may periodically configure switching circuitry 44 to couple the faulty path to a voltage measuring circuit such as ADC 47 and determine whether the voltage received at the faulty path has stabilized to a target operating voltage. In response to determining that the identified fault is a transient fault (e.g., that the voltage received at the faulty path has stabilized), control circuitry 48 may enable the accessory device during optional step 112 (e.g., by configuring switching circuitry 44 to route signals from the accessory device to a compatible processing interface of circuitry 46). The process may then return to step 106 to protect circuitry on device 10 from connector faults.

In some scenarios, it may be desirable to minimize electronic device power consumption. For example, electronic device 10 may be a portable electronic device such as a cellular telephone, media player, or notebook computer that operates on a battery. In this scenario, the battery may have limited energy capacity and it may be desirable to reduce power consumption to maximize battery life. If desired, control circuitry 48 may disable detection circuits 51 during step 110 and re-enable detection circuits 51 during step 112 to conserve power.

Figure 8:
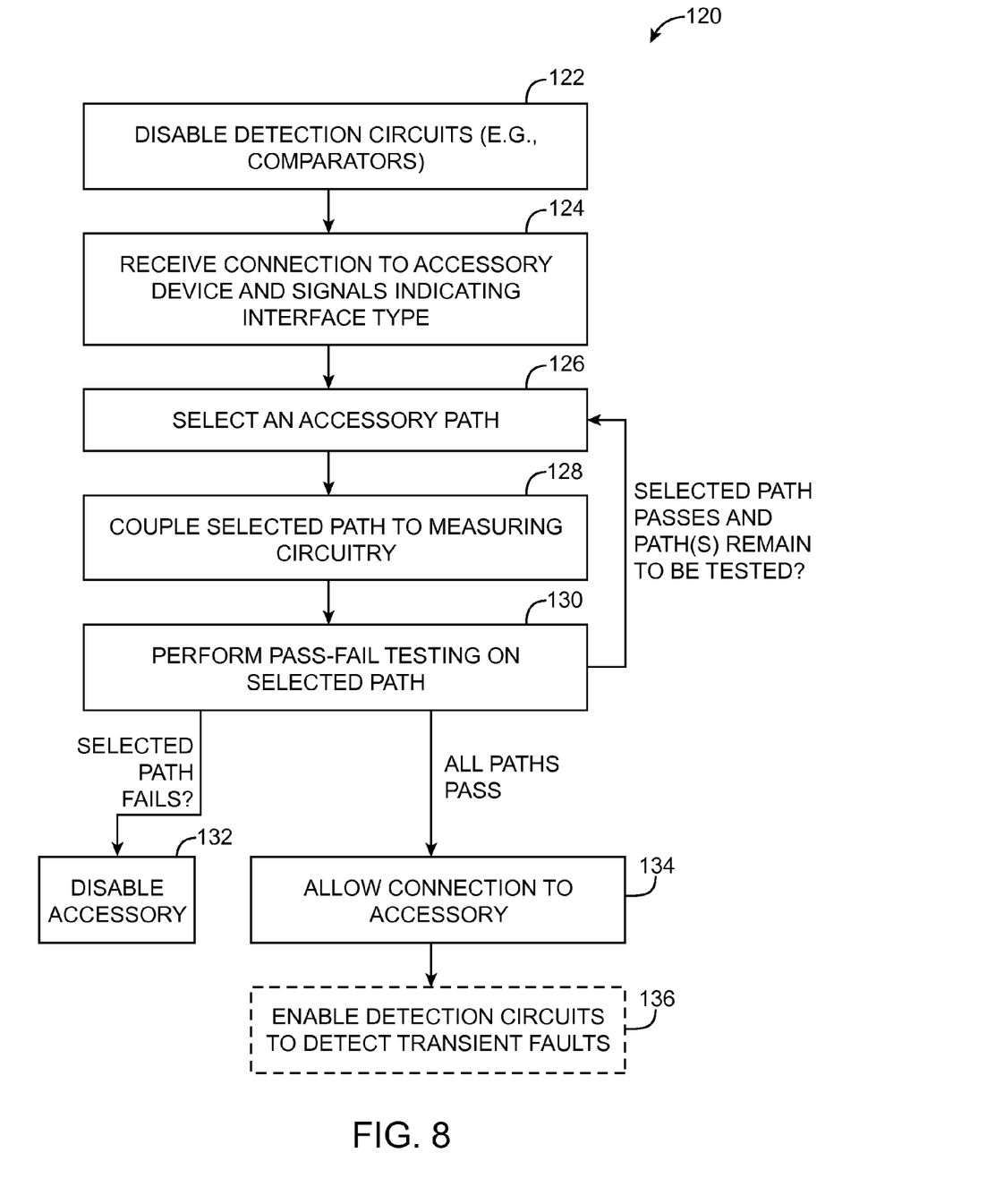
FIG. 8 is a flow chart of illustrative steps that may be performed by an electronic device using power protection circuitry to protect against connection faults while conserving power in accordance with an embodiment of the present invention.

FIG. 8 is a flow chart 120 of illustrative steps that may be performed to provide connector fault protection with reduced power consumption. Detection circuits such as circuits 51 may be disabled during initial step 122. For example, control circuitry 48 may provide control signals to detection circuits 51 that disable comparators 50 and DAC circuits 52 so that minimal power is consumed by circuits 51.

During step 124, device 10 may receive a connection to an accessory device and signals indicating the accessory interface type (e.g., similar to step 102 of flow chart 100 as shown in FIG. 7).

During step 126, control circuitry 48 may select an accessory path for fault testing. For example device 10 may select a path associated with a connector port contact 23 (e.g., a path on which signal P_IN, DX1, DX2, ACCX, or other signals are received from the accessory device).

During step 128, protection circuitry 42 may couple the selected path to measuring circuitry. For example, control circuitry 48 may direct switching circuitry 44 to route signals on the selected path to ADC circuit 47.

During step 130, protection circuitry 42 may perform pass-fail testing on the selected path. For example, control circuitry 48 may compare the measured ADC value to a digital threshold value corresponding to the identified interface type the accessory (e.g., similar to analog comparisons performed by comparators 50). If the measured ADC value is less than the threshold value, the selected path may pass testing. Each path may be compared to a different digital threshold value or may be compared to the same digital threshold value. If the measured ADC value exceeds the threshold value, the selected path may fail testing and control circuitry 48 may disable the accessory device during step 132. If the selected path passes and paths remain to be tested, the process may return to step 126. If paths remain to be tested, the process may return to step 126 to test the remaining paths. If all paths to be tested pass, the electrical connection to the accessory may be allowed and control circuitry 48 may configure switching circuitry 44 to route signals from the accessory to a compatible interface of circuitry 46.

If desired, optional step 136 may be subsequently performed. During optional step 136, the detection circuits may be enabled to detect transient and permanent faults that occur after initial accessory connection. Step 136 may, for example, be similar to steps 104-112 of flowchart 100 as shown in FIG. 7.

By initially disabling detection circuits 51, unnecessary power consumption associated with detection circuits 51 may be avoided. In the case that optional step 136 is not performed, permanent faults may be detected using steps 126-130 while minimizing power consumption.

The foregoing is merely illustrative of the principles of this invention and various modifications can be made by those skilled in the art without departing from the scope and spirit of the invention.

What is claimed is:

1. A portable electronic device operable to communicate with an accessory device when the accessory device is coupled to the portable electronic device, the portable electronic device comprising:
   a connector port having a plurality of contacts each operable to receive a respective signal having a signal voltage from the accessory device;
   processing circuitry operable to receive the signals from the plurality of contacts of the connector port; and
   protection circuitry coupled between the processing circuitry and the connector port, wherein the protection circuitry assigns a threshold voltage to each contact of the connector port based on a communications protocol used by the accessory device coupled to the portable electronic device, wherein the protection circuitry monitors the signal voltage of each of the contacts to identify which contacts have signal voltages that exceed the assigned threshold voltages, and wherein the protection circuitry electrically disconnects the processing circuitry from the identified contacts.

2. The portable electronic device defined in claim 1 wherein the protection circuitry comprises:
   a plurality of detection circuits each coupled to a respective contact of the connector port, wherein each detection circuit of the plurality of detection circuits produces a detection signal that identifies whether the signal voltage of the respective contact exceeds the at least one threshold voltage.

3. The portable electronic device defined in claim 2 wherein the plurality of detection circuits comprises:
   a first detection circuit that identifies whether the signal voltage of the contact coupled to the first detection circuit exceeds the threshold voltage assigned to the first detection circuit; and
   a second detection circuit that identifies whether the signal voltage of the contact coupled to the second detection circuit exceeds the threshold voltage assigned to the second detection circuit.

4. The portable electronic device defined in claim 2 wherein each detection circuit of the plurality of detection circuits comprises:
   a comparator that receives the threshold voltage and compares the signal voltage of the respective contact to the assigned threshold voltage of the respective contact.

5. The portable electronic device defined in claim 4 wherein each detection circuit of the plurality of detection circuits further comprises:
   a digital-to-analog converter that produces the threshold voltage assigned to the respective contact of that detection circuit.

6. The portable electronic device defined in claim 2 wherein the protection circuitry further comprises switching circuitry interposed between the processing circuitry and the plurality of contacts.

7. The portable electronic device defined in claim 6 wherein the protection circuitry further comprises control circuitry that receives the detection signals from the plurality of detection circuits and controls the switching circuitry based on the detection signals.

8. The portable electronic device defined in claim 7 wherein the control circuitry is configured to control the switching circuitry to electrically disconnect each contact from the processing circuitry in response to determining that the detection signal associated with that contact identifies that the signal voltage of that contact exceeds the assigned threshold voltage of that contact.

9. The portable electronic device defined in claim 8 wherein the processing circuitry comprises:
   a first interface operable to communicate with the accessory device using a first communications protocol; and
   a second interface operable to communicate with the accessory device using a second communications protocol.

10. The portable electronic device defined in claim 9 wherein the first interface comprises a universal serial bus interface.

11. The portable electronic device defined in claim 10 wherein the second interface comprises a universal asynchronous receiver-transmitter interface.

12. The portable electronic device defined in claim 9 wherein the switching circuitry is operable to route the signals from the contacts to the first interface in a first configuration and further operable to route the signals from the contacts to the second interface in a second configuration.

13. The portable electronic device defined in claim 1 wherein the connector port comprises a reversible connector port operable to receive a reversible connector plug with at least first and second orientations.

14. A method of operating an electronic device that communicates with an accessory device using a connector port, wherein the connector port is operable to receive signals from the accessory device via a plurality of signal paths, the method comprising:
   with detection circuitry, monitoring the signals received at the connector port to produce detection signals that identify whether faulty signal paths exist between the connector port and the accessory device; and
   in response to identifying that faulty signal paths exist between the connector port and the accessory device, electrically disconnecting only the identified faulty signal paths with switching circuitry.

15. The method defined in claim 14 further comprising:
   with control circuitry, receiving the detection signals from the detection circuitry; and
   with the control circuitry, controlling the switching circuitry to electrically disconnect only the identified faulty signal paths based on the detection signals.

16. The method defined in claim 15 wherein the electronic device includes processing circuitry having a first interface operable to communicate with the accessory device using a first communications protocol and a second interface operable to communicate with the accessory device using a second communications protocol, the method further comprising:
   with the connector port, receiving an identification signal from the accessory device;
   with the control circuitry, selecting an interface from the first and second interfaces based on the identification signal; and
   with the control circuitry, configuring the switching circuitry to couple the connector port to the selected interface.

17. The method defined in claim 16 wherein the detection circuitry comprises a plurality of comparators each coupled to a respective signal path of the plurality of signal paths of the connector port, the method further comprising:
   with each comparator, receiving a corresponding reference voltage; and
   with each comparator, comparing the reference voltage of that comparator to the signal of the signal path to which the comparator is coupled to produce a respective one of the detection signals.

18. The method defined in claim 17 further comprising:
   with a plurality of digital-to-analog converters coupled to the plurality of comparators, producing the reference voltages based on a plurality of control signals; and
   with the control circuitry, generating the plurality of control signals based on the identification signal from the connector port.

19. The method defined in claim 16 further comprising:
   with the control circuitry, configuring the switching circuitry to route the identification signal from the connector port to an analog-to-digital converter; and
   with the analog-to-digital converter, providing a digital identification signal to the control circuitry, wherein generating the plurality of control signals based on the identification signal comprises generating the plurality of control signals based on the digital identification signal.

20. The method defined in claim 15 further comprising:
   with the control circuitry, enabling a counter in response to identifying that faulty signal paths exist between the connector port and the accessory device, wherein the counter produces a counter value and wherein controlling the switching circuitry to electrically disconnect only the identified faulty signal paths based on the detection signals comprises:

controlling the switching circuitry to electrically disconnect only the identified faulty signal paths after the counter value reaches a threshold counter value while the detection signals identify that faulty signal paths exist between the connector port and the accessory device.

21. A method of operating an electronic device operable to communicate with an accessory device using a connector port, the method comprising:

with control circuitry, disabling real-time fault detection circuitry that is coupled to the connector port;
with the connector port, receiving a connection to the accessory device;
with the control circuitry, performing pass-fail testing on the received connection to the accessory device; and
with the control circuitry, configuring switching circuitry to couple the connector port to processing circuitry in response to determining that the received connection passes testing.

22. The method defined in claim 21 wherein the connector port includes a plurality of contacts at which the connection to the accessory device is received and wherein performing the pass-fail testing on the received connection comprises:

with the control circuitry, configuring the switching circuitry to sequentially couple each contact of the plurality of contacts to measuring circuitry that measures voltage received from the accessory device at that contact;
with the control circuitry, determining whether the measured voltage of any contact of the plurality of contacts exceeds a threshold voltage;
with the control circuitry, determining that the received connection fails testing in response to determining that the measured voltage of any contact exceeds the threshold voltage; and
with the control circuitry, determining that the received connection passes testing in response to determining that none of the measured voltages exceed the threshold voltage.

23. The method defined in claim 21 further comprising:
with the control circuitry, configuring the switching circuitry to electrically isolate the connector port from the processing circuitry in response to determining that the received connection fails testing.

24. The method defined in claim 21 further comprising:
with the control circuitry, enabling the real-time fault detection circuitry in response to determining that the received connection passes testing.

25. The method defined in claim 21 further comprising:
with the control circuitry, identifying the accessory device using voltage measuring circuitry that is coupled to the connector port, wherein performing the pass-fail testing comprises:

detecting whether a permanent fault is associated with the connection using the voltage measuring circuitry.

* * * * *